United States Patent
Auvenshine et al.

(10) Patent No.: US 10,241,765 B2
(45) Date of Patent: Mar. 26, 2019

(54) APPARATUSES, METHODS, AND COMPUTER PROGRAM PRODUCTS FOR REDUCING SOFTWARE RUNTIME

(71) Applicant: International Business Machines Corporation, Armonk, NY (US)

(72) Inventors: John J. Auvenshine, Tucson, AZ (US); Anthony J. Ciaravella, Tucson, AZ (US); John T. Olson, Tucson, AZ (US); Richard A. Welp, Manchester (GB)

(73) Assignee: International Business Machines Corporation, Armonk, NY (US)

(*) Notice: Subject to any disclaimer, the term of this patent is extended or adjusted under 35 U.S.C. 154(b) by 9 days.

(21) Appl. No.: 15/339,431

(22) Filed: Oct. 31, 2016

(65) Prior Publication Data
US 2018/0121179 A1 May 3, 2018

(51) Int. Cl.
*G06F 8/41* (2018.01)
*G06F 9/445* (2018.01)
*G06F 11/30* (2006.01)

(52) U.S. Cl.
CPC ............ *G06F 8/4441* (2013.01); *G06F 9/445* (2013.01); *G06F 11/30* (2013.01)

(58) Field of Classification Search
CPC .................................................. G06F 8/4441
USPC ........................................................ 717/154
See application file for complete search history.

(56) References Cited

U.S. PATENT DOCUMENTS

| | | | |
|---|---|---|---|
| 5,319,784 A * | 6/1994 | Parikh | G06F 8/443 717/158 |
| 5,608,909 A * | 3/1997 | Atkinson | G06F 12/0875 711/118 |
| 6,484,188 B1 | 11/2002 | Kwong et al. | |
| 6,854,115 B1 * | 2/2005 | Traversat | G06F 11/203 711/113 |
| 7,058,763 B2 * | 6/2006 | Gabber | G06F 17/30067 707/E17.01 |
| 7,706,629 B2 | 4/2010 | Rosasco et al. | |
| 8,132,162 B2 * | 3/2012 | Peterson | G06F 9/443 717/148 |
| 8,264,973 B2 | 9/2012 | Vasan et al. | |
| 2002/0144019 A1 * | 10/2002 | Gooding | G06F 9/547 719/330 |
| 2008/0162815 A1 * | 7/2008 | Chetuparambil | G06F 17/30902 711/118 |

(Continued)

FOREIGN PATENT DOCUMENTS

GB 2522433 7/2015

OTHER PUBLICATIONS

Richardson, S.E., "Caching Function Results: Faster Arithmetic by Avoiding Unnecessary Computation", Sun Microsystems Technical Report, Sep. 1992, 20 pages.

*Primary Examiner* — Ryan D. Coyer
(74) *Attorney, Agent, or Firm* — Kunzler, PC (57) ABSTRACT

An apparatus, method, system, and program product are disclosed for reducing software runtime. One method includes determining a result produced in response to executing code. The method also includes storing the result. The method includes receiving a request to execute the code. The method also includes, without executing the code, providing the result in response to receiving the request to execute the code.

11 Claims, 5 Drawing Sheets

(56) References Cited

U.S. PATENT DOCUMENTS

| | | | |
|---|---|---|---|
| 2011/0296384 A1* | 12/2011 | Pasternak | G06F 11/3688 |
| | | | 717/124 |
| 2013/0066952 A1 | 3/2013 | Colrain et al. | |
| 2013/0152047 A1* | 6/2013 | Moorthi | G06F 11/368 |
| | | | 717/124 |
| 2014/0244902 A1* | 8/2014 | Simionescu | G06F 12/0893 |
| | | | 711/103 |
| 2015/0121013 A1 | 4/2015 | Chiang et al. | |
| 2016/0210044 A1* | 7/2016 | Mitkar | G06F 3/061 |

* cited by examiner

APPARATUSES, METHODS, AND COMPUTER PROGRAM PRODUCTS FOR REDUCING SOFTWARE RUNTIME

FIELD

The subject matter disclosed herein relates to software and more particularly relates to reducing software runtime.

BACKGROUND

Computing devices may include applications that perform a variety of tasks. Certain applications may include routines that take considerable time to execute. Such routines may utilize a large number of computer resources.

BRIEF SUMMARY

A method for reducing software runtime is disclosed. An apparatus and computer program product may also perform the functions of the method. In one embodiment, an apparatus includes a result determination module that determines a result produced in response to executing code. The apparatus, in a further embodiment, includes a storage module that stores the result. In certain embodiments, the apparatus includes a request reception module that receives a request to execute the code. In some embodiment, the apparatus includes a bypass module that, without executing the code, provides the result in response to receiving the request to execute the code. In various embodiments, at least a portion of the result determination module, the storage module, the request reception module, and the bypass module includes one or more of hardware and executable code with the executable code being stored on one or more computer readable storage media.

A method for reducing software runtime is disclosed. In one embodiment, the method includes determining a result produced in response to executing code. In various embodiments, the method includes storing the result. In some embodiments, the method includes receiving a request to execute the code. In certain embodiments, the method includes, without executing the code, providing the result in response to receiving the request to execute the code.

A computer program product for reducing software runtime is disclosed. In some embodiments, the computer program product includes a computer readable storage medium having program instructions embodied therewith. In certain embodiments, the program instructions are executable by a processor to cause the processor to determine a result produced in response to executing code. In various embodiments, the program instructions are executable by a processor to cause the processor to store the result. In certain embodiments, the program instructions are executable by a processor to cause the processor to receive a request to execute the code. In some embodiments, the program instructions are executable by a processor to cause the processor to, without executing the code, provide the result in response to receiving the request to execute the code.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1:
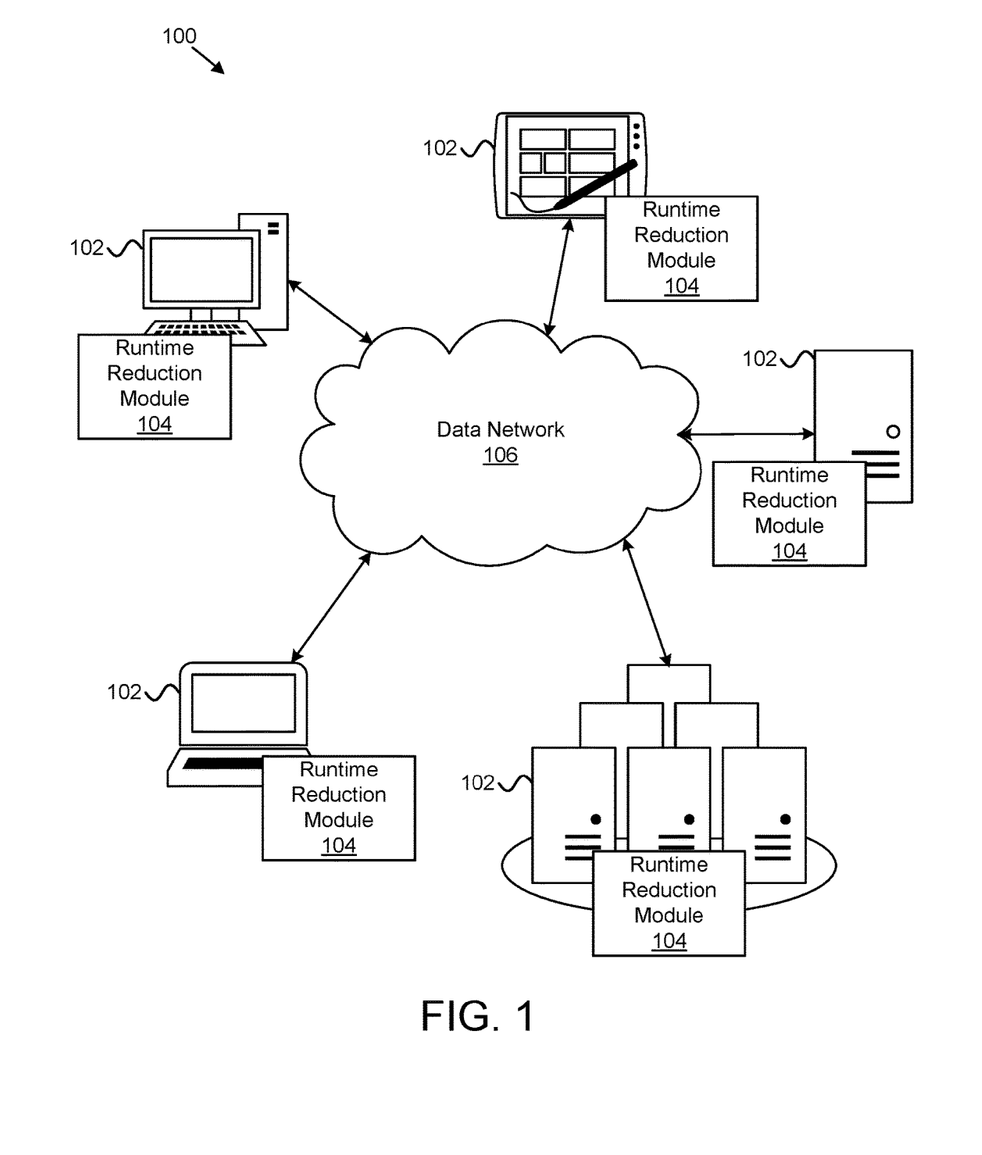
FIG. 1 is a schematic block diagram illustrating one embodiment of a system for reducing software runtime in accordance with one embodiment of the present invention.

FIG. 1 depicts one embodiment of a system 100 for reducing software runtime. In one embodiment, the system 100 includes information handling devices 102, runtime reduction modules 104, and data networks 106. Even though a particular number of information handling devices 102, runtime reduction modules 104, and data networks 106 are depicted in the system 100 of FIG. 1, one of skill in the art will recognize that any number or configuration of information handling devices 102, runtime reduction modules 104, and data networks 106 may be present in the system 100.

The information handling devices 102, in certain embodiments, include computing devices, such as desktop computers, laptop computers, tablet computers, smart phones, smart televisions, fitness trackers, activity trackers, personal electronic devices, smart watches, or the like. The information handling devices 102 may also include servers, such as web servers, application servers, file servers, media servers, email servers, cloud servers, backup servers, virtual servers, or the like. In some embodiments, the information handling devices 102 may be part of a data center used for data storage, data backup, data replication, disaster recovery, mirroring, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous data replication. In another example, information handling devices 102 may be configured as failover devices for one or more associated information handling devices 102. Moreover, the information handling devices 102 may include one or more storage volumes, storage devices, redundant array of independent disks ("RAID") devices or configurations, or the like, such as hard-disk drives, solid-state drives, flash memory devices, random-access memory ("RAM"), serial advanced technology attachment ("SATA") devices, tape devices, or the like. In some embodiments, the information handling devices 102 are in communication via one or more data networks 106, described below. In various embodiments, the information handling devices 102 may include a display, a speaker, a microphone, and so forth.

In one embodiment, the runtime reduction module 104 determines a result produced in response to executing code. In some embodiments, the runtime reduction module 104 stores the result. In certain embodiments, the runtime reduction module 104 receives a request to execute the code. In various embodiments, the runtime reduction module 104, without executing the code, provides the result in response to receiving the request to execute the code. In this manner, the runtime reduction module 104 may facilitate reducing software runtime.

As may be appreciated, the runtime reduction module 104 may be used in any suitable system 100. In certain embodiments, as described below with reference to FIGS. 2 and 3, the runtime reduction module 104 includes multiple modules that perform the operations of the runtime reduction module 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
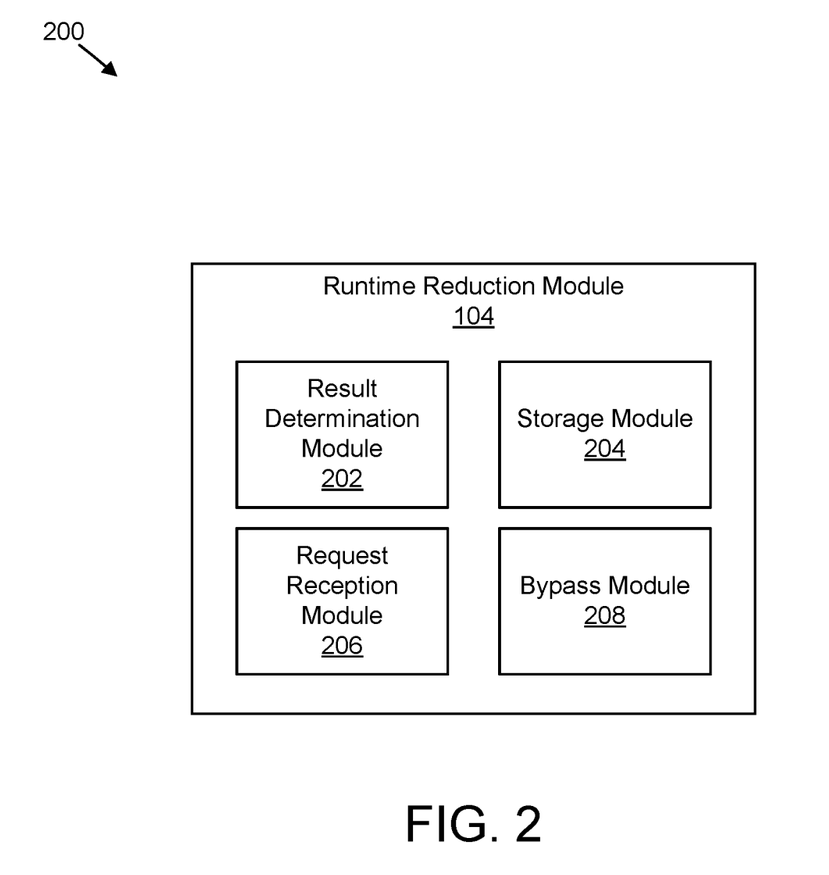
FIG. 2 is a schematic block diagram illustrating one embodiment of a module for reducing software runtime in accordance with one embodiment of the present invention.

FIG. 2 is a schematic block diagram illustrating one embodiment of a module 200 for reducing software runtime. In one embodiment, the module 200 includes an embodiment of a runtime reduction module 104. The runtime reduction module 104, in various embodiments, includes one or more of a result determination module 202, a storage module 204, a request reception module 206, and a bypass module 208, which are described in more detail below.

In one embodiment, the result determination module 202 determines a result produced in response to executing code. The result may include one or more outputs produced by executing the code. In some embodiments, the code is executed by providing one or more arguments to the code prior to (or during) execution of the code. The result may directly correspond to the one or more arguments used by the code during execution. As may be appreciated, by determining a direct correlation between the one or more arguments and the result, the result may be provided to an application that executes the code without executing the code each time, thereby reducing software runtime. It should be noted that the code may be any suitable code that includes one or more programming instructions. The result determination module 202 may determine a result corresponding to multiple different executed codes and/or a result corresponding to multiple different sets of one or more arguments used by the code during execution. In some embodiments, the result determination module 202 may randomly sample function runtime behavior to facilitate an overall impact of code execution on the system.

The storage module 204, in one embodiment, stores the result. In some embodiments, the storage module 204 stores the result in cache. In certain embodiments, the storage module 204 stores multiple results and the code and/or arguments corresponding to a respective result. In various embodiments, the storage module 204 stores the result in a lookup table that includes a reference to the code, one or more arguments corresponding to the result, and/or the result. In some embodiments, the storage module 204 determines to store the result based on a functional behavior of the executed code. The functional behavior may include an execution time, a result size, a result variance, and/or a result history.

In certain embodiments, the request reception module 206 receives a request to execute the code. In some embodiments, the request to execute the code is received in response to a function call. In such embodiments, the function call includes one or more arguments. As may be appreciated, the request to execute the code may be received after a result is stored. In some embodiments, the bypass module 208, without executing the code, provides the result in response to receiving the request to execute the code. Accordingly, the code does not have to be executed in order to obtain the result of executing the code.

In certain embodiments, the runtime reduction module 104 may re-execute the code after storing the result and update the stored result in response to re-executing the code. For example, the runtime reduction module 104 may re-execute the code in response to one or more arguments provided to the code changing. In various embodiments, at least a portion of the result determination module 202, the storage module 204, the request reception module 206, and the bypass module 208 includes one or more of hardware and executable code. In such embodiments, the executable code may be stored on one or more computer readable storage media.

Figure 3:
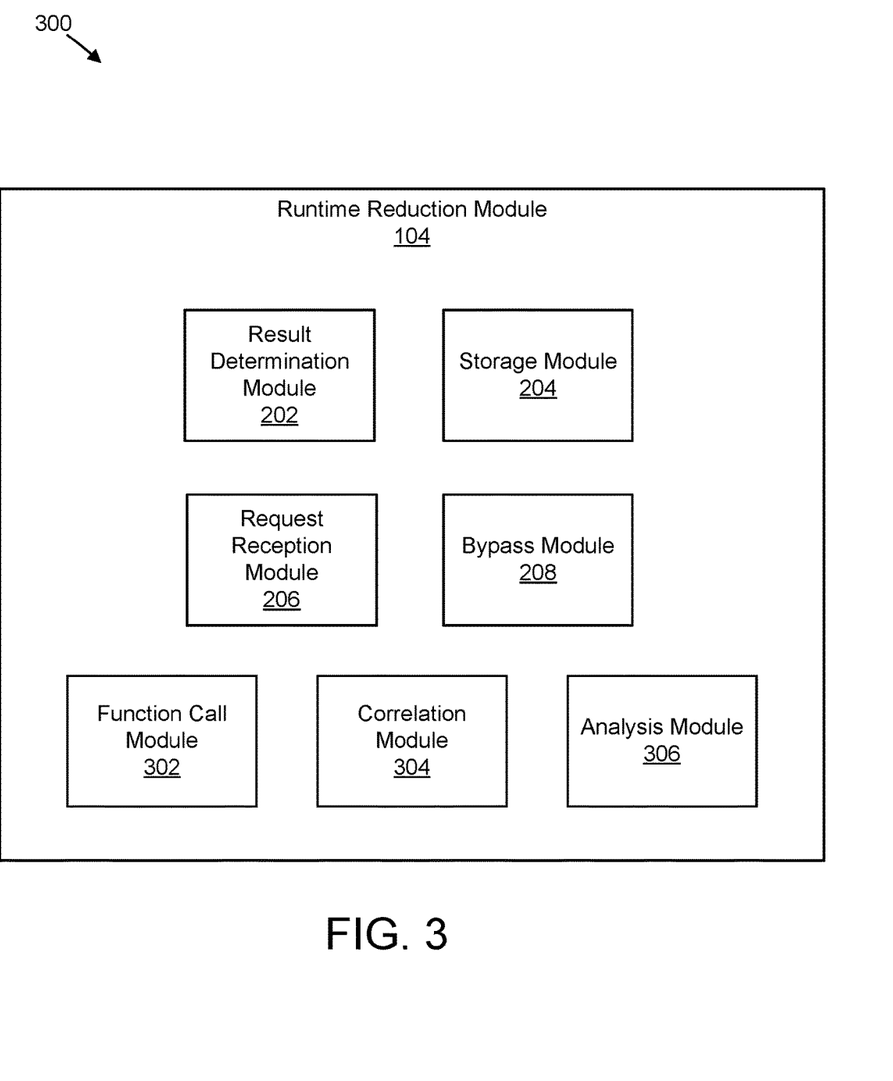
FIG. 3 is a schematic block diagram illustrating one embodiment of another module for reducing software runtime in accordance with one embodiment of the present invention.

FIG. 3 is a schematic block diagram illustrating one embodiment of another module 300 for reducing software runtime. In one embodiment, the module 300 includes an embodiment of a runtime reduction module 104. The runtime reduction module 104, in various embodiments, includes one or more of a result determination module 202, a storage module 204, a request reception module 206, and a bypass module 208, which may be substantially similar to the result determination module 202, the storage module 204, the request reception module 206, and the bypass module 208 described above. The runtime reduction module 104 may also include one or more of a function call module 302, a correlation module 304, and an analysis module 306, which are described in more detail below.

In one embodiment, the function call module 302 includes a function call that requests to execute the code. In such an embodiment, the function call may include one or more arguments. Thus, the function call module 302 may be used to execute the code. After a result from executing the code has been stored, the function call module 302 may request to execute the code, but execution of the code may be bypassed and the result may be provided to the function call module 302 without executing the code.

The correlation module 304, in certain embodiments, determines a correlation between one or more arguments used by the code during execution and the result. In other words, the correlation module 304 may determine that the result is generally produced if the code is executed using one or more specific arguments. The correlation module 304 may work in conjunction with the analysis module 306 to determine the correlation.

In some embodiments, the analysis module 306 analyzes functional behavior of the code during execution. Such functional behavior may include an execution time, a result size, a result variance, and/or a result history. In various embodiments, the result may be stored based on the functional behavior. For example, a result may not be stored if the execution time of the code is short, a result may not be stored if the result size is very large, and/or a result may not be stored if the result is different with each execution of the code. In certain embodiments, the analysis module 306 may use code instrumentation to analyze the functional behavior (e.g., collect runtime statistics and functional results). The code instrumentation may include manual code insertion and/or compile time insertion.

In various embodiments, based on collected runtime statistics for a code segment (e.g., a function) using specific code input (e.g., one or more arguments), if the code segment execution takes longer than some predetermined threshold, the result determination module 202 may monitor return results of the code segment. In some embodiments, the analysis module 306 may rank code segments by speed and may analyze only the slowest percentage of code segments.

In some embodiments, if the runtime statistics for a code segment indicate that results are unlikely to change for a given input or inputs (e.g., the result for a given input is the same for a predetermined number of calls to a function), then it may be determined that the result is unlikely to change. Moreover, if the result is within a configurable or predetermined size limit, then the runtime reduction module 104 may cache the result for the given input. In one embodiment, the runtime reduction module 104 may cache the result using a hash map of the input as a key and the result as the value.

In various embodiments, future calls to the code segment after caching a corresponding result may return the result based on the input instead of executing the code segment. To facilitate updates to cache entries, the runtime reduction module 104 may facilitate registering callback entries to the code segment. For example, if a first function would create a change in the returned result for a second function, the runtime reduction module 104 may allow registering a callback from the first function to the second function so that when the first function finishes executing the second function will execute and update the cache contents.

In certain embodiments, the runtime reduction module 104 may offload recorded runtime statistics to an analytic engine. The analytic engine may receive data captured from code profiling for calls to the code segment and results for functions. Using event correlation analysis, such as statistical causality analysis, output from the analytic engine may indicate a correlation between calls to a first code segment and results that change in second code segment as a result of calls to the first code segment. Based on such a correlation, the result of the second code segment stored in cache may be invalidated whenever the first code segment is called. In some embodiments, the analytic engine may push back callback code segments to the runtime reduction module 104 to insert based on a determined correlation. In some embodiments, runtime statistics may be made available for review, such as if the runtime reduction module 104 is unable to cache results.

Figure 4:
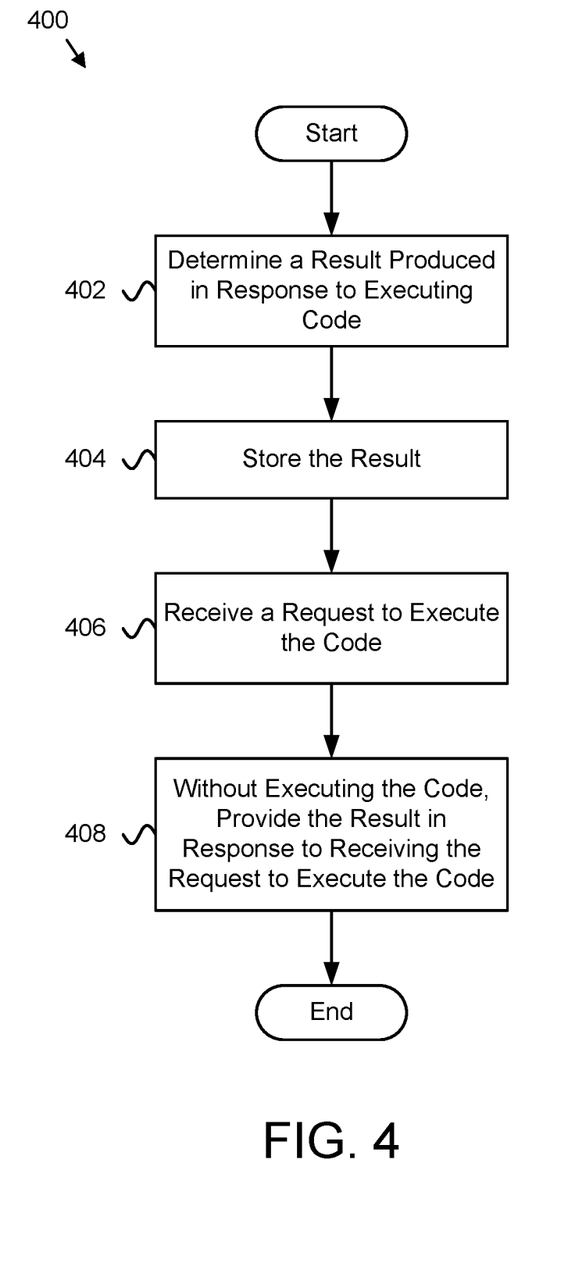
FIG. 4 is a schematic flow chart diagram illustrating one embodiment of a method for reducing software runtime in accordance with one embodiment of the present invention.

FIG. 4 is a schematic flow chart diagram illustrating one embodiment of a method 400 for reducing software runtime. In certain embodiments, the method 400 may be performed by the runtime reduction module 104. In one embodiment, the method 400 begins and determines 402 a result produced in response to executing code. In some embodiments, the result determination module 202 determines 402 the result produced in response to executing the code. In various embodiments, the method 400 may determine a correlation between one or more arguments used to execute code and the result. In certain embodiments, the method 400 may analyze functional behavior of the code during execution. The function behavior may include an execution time, a result size, a result variance, a result history, or some combination thereof.

The method 400 may store 404 the result. In one embodiment, the storage module 204 may store 404 the result. In certain embodiments, the method 400 may store 404 the result based on the functional behavior. In some embodiments, the method 400 may store 404 the result in a cache.

The method 400 may receive 406 a request to execute the code. In one embodiment, the request reception module 206 may receive 406 the request to execute the code. In certain embodiments, the request to execute the code may be received in response to a function call. In such embodiments, the function call may include one or more arguments.

The method 400 may, without executing the code, provide 408 the result in response to receiving the request to execute the code. In one embodiment, the bypass module 208 may, without executing the code, provide 408 the result in response to receiving the request to execute the code. In certain embodiments, the method 400 may re-execute the code after storing the result, and update the stored result in response to re-executing the code.

Figure 5:
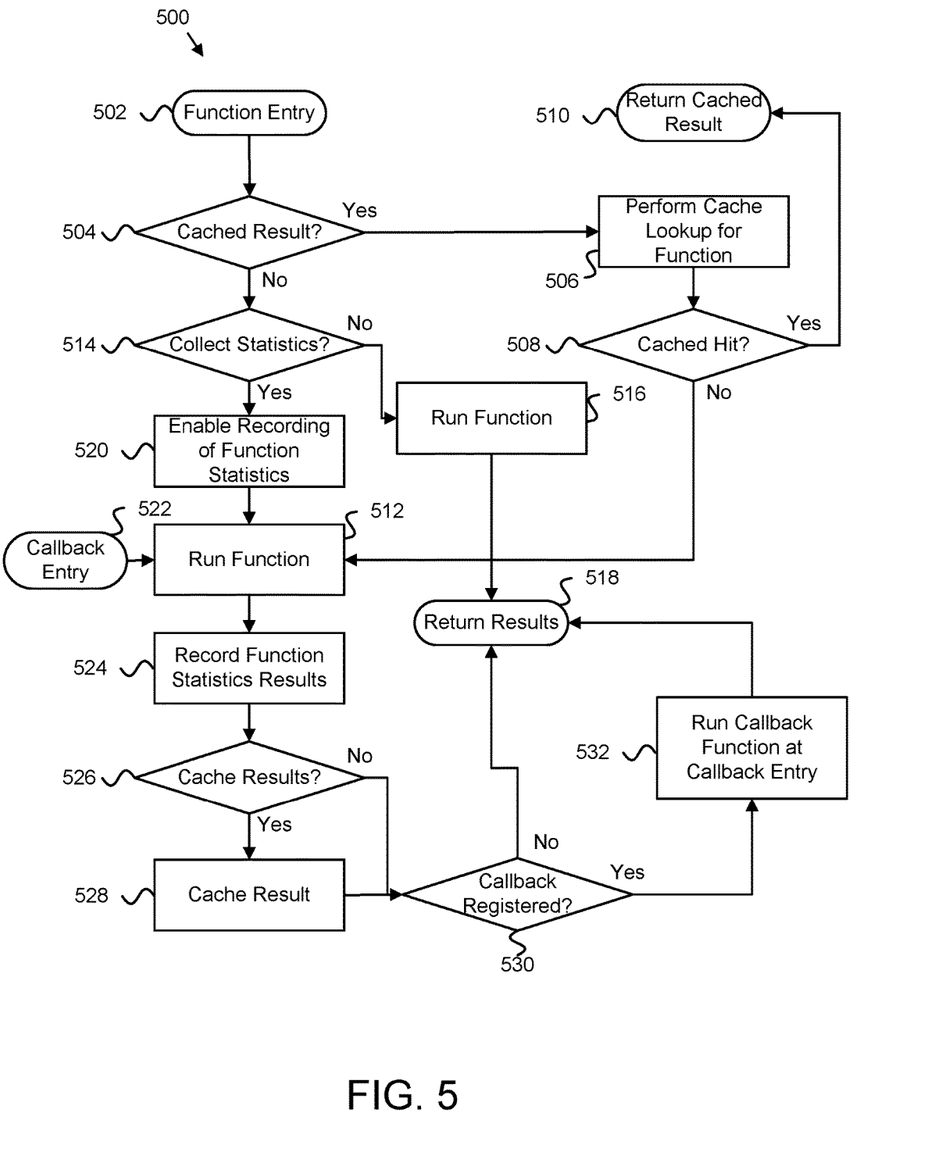
FIG. 5 is a schematic flow chart diagram illustrating another embodiment of a method for reducing software runtime in accordance with one embodiment of the present invention.

FIG. 5 is a schematic flow chart diagram illustrating another embodiment of a method 500 for reducing software runtime. In certain embodiments, the method 500 may be performed by the runtime reduction module 104. In one embodiment, the method 500 begins with a function entry 502 which occurs when a function (e.g., code segment) is called for execution. The method 500 determines 504 whether there is a cached result corresponding to the function. If the method 500 determines 504 that there is a cached result, the method 500 performs 506 a lookup for the function. The method 500 then determines 508 whether there is a cache hit corresponding to the function and one or arguments corresponding to the function. If the method 500 determines 508 that there is a cache hit, the method 500 returns 510 the cached result. If the method 500 determines 508 that there is not a cache hit, the method 500 runs 512 (e.g., executes) the function.

If the method 500 determines 504 that there is not a cached result, the method 500 determines 514 whether to collect runtime statistics for the function. If the method 500 determines 514 not to collect runtime statistics for the function, the method 500 runs 516 (e.g., executes) the function. The method 500 then returns 518 results corresponding to the function run.

If the method 500 determines 514 to collect runtime statistics for the function, the method 500 enables 520 recording of function runtime statistics. The method 500 then runs 512 the function. In some embodiments, the method 500 may run 512 the function in response to a callback entry 522.

After running 512 the function, the method 500 records 524 the function runtime statistics. Based on the function runtime statistics, the method 500 determines 526 whether to cache results. If the method 500 determines 526 to cache the results, the method 500 caches 528 the results, then the method 500 determines 530 whether there is a callback function registered. If the method 500 determines 526 not to cache the results, the method 500 determines 530 whether there is a callback function registered.

If the method 500 determines 530 that there is no callback function registered, the method 500 returns 518 the results. If the method 500 determines 530 that there is a callback function registered, the method 500 runs 532 the callback function at the callback entry 522.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a result determination module that determines a result produced in response to executing code via a function call;
a storage module that stores the result;
a request reception module that receives a request to execute the code;
a bypass module that, without executing the code, provides the result in response to receiving the request to execute the code;
an analysis module that analyzes functional behavior of the code during execution to determine whether to store the result, wherein the functional behavior comprises an execution time, a result variance, a result history, or some combination thereof, and wherein the analysis module:
determines whether the execution time of the code exceeds a predetermined time threshold;
in response to the execution time of the code exceeding the predetermined threshold, determines whether the result history indicates that a result size is less than a predetermined size threshold;
in response to the result size being less than the predetermined size threshold, determines whether the result variance indicates that results of executing the code are unlikely to change for a given set of inputs; and
stores the result in response to the result variance indicating that the results of executing the code are unlike to change for the given set of inputs; and
a function call module having a function call that requests to execute the code, wherein the function call comprises one or more arguments;
wherein at least a portion of the result determination module, the storage module, the request reception module, and the bypass module comprises one or more of hardware and executable code, the executable code being stored on one or more non-transitory computer readable storage media.

2. The apparatus of claim 1, further comprising a correlation module that determines a correlation between the one or more arguments and the result.

3. A method for reducing software runtime, comprising:
determining a result produced in response to executing code via a function call;
storing the result;
receiving a request to execute the code in response to the function call, wherein the function call comprises one or more arguments;
without executing the code, providing the result in response to receiving the request to execute the code; and
analyzing functional behavior of the code during execution to determine whether to store the result, wherein the functional behavior comprises an execution time, a result variance, a result history, or some combination thereof, wherein analyzing the functional behavior comprises:
- determining whether the execution time of the code exceeds a predetermined time threshold;
- in response to the execution time of the code exceeding the predetermined threshold, determining whether the result history indicates that a result size is less than a predetermined size threshold;
- in response to the result size being less than the predetermined size threshold, determining whether the result variance indicates that results of executing the code are unlikely to change for a given set of inputs; and
- storing the result in response to the result variance indicating that the results of executing the code are unlike to change for the given set of inputs.

4. The method of claim 3, further comprising determining a correlation between the one or more arguments and the result.

5. The method of claim 3, wherein storing the result further comprises storing the result based on the functional behavior.

6. The method of claim 3, wherein storing the result further comprises storing the result in a cache.

7. The method of claim 3, further comprising re-executing the code after storing the result and updating the stored result in response to re-executing the code.

8. A computer program product for reducing software runtime, the computer program product comprising a non-transitory computer readable storage medium having program instructions embodied therewith, the program instructions executable by a processor to cause the processor to:
- determine a result produced in response to executing code via a function call;
- store the result;
- receive a request to execute the code in response to the function call, wherein the function call comprises one or more arguments;
- without executing the code, provide the result in response to receiving the request to execute the code; and
- analyze functional behavior of the code during execution to determine whether to store the result, wherein the functional behavior comprises an execution time, a result variance, a result history, or some combination thereof, wherein analyzing the functional behavior comprises:
  - determining whether the execution time of the code exceeds a predetermined time threshold;
  - in response to the execution time of the code exceeding the predetermined threshold, determining whether the result history indicates that a result size is less than a predetermined size threshold;
  - in response to the result size being less than the predetermined size threshold, determining whether the result variance indicates that results of executing the code are unlikely to change for a given set of inputs; and
  - storing the result in response to the result variance indicating that the results of executing the code are unlike to change for the given set of inputs.

9. The computer program product of claim 8, wherein the program instructions cause the processor to determine a correlation between one or more arguments used to execute the code and the result.

10. The computer program product of claim 8, wherein the program instructions cause the processor to store the result in a cache.

11. The computer program product of claim 8, wherein the program instructions cause the processor to re-execute the code after storing the result and update the stored result in response to re-executing the code.

* * * * *